United States Patent
Tilford

(10) Patent No.: US 8,819,744 B1
(45) Date of Patent: Aug. 26, 2014

(54) MINIATURE WIRELESS AUDIO/VIDEO/DATA DISTRIBUTION AND ACCESS SYSTEM

(75) Inventor: Arthur R. Tilford, Yorba Linda, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 09/038,084

(22) Filed: Mar. 11, 1998

(51) Int. Cl.
  *H04N 7/18* (2006.01)
  *H04N 7/16* (2011.01)
  *H04N 5/64* (2006.01)

(52) U.S. Cl.
  USPC .............................. 725/74; 725/141; 348/838

(58) Field of Classification Search
  USPC ............. 348/6, 8, 12, 13, 7, 10, 838; 455/3.1, 455/3.2, 6.1, 6.2, 17, 19, 23, 66, 11.1; 725/62, 105, 117, 126, 132, 81, 82, 74, 725/141; 370/218, 355, 490, 493
  See application file for complete search history.

(56) References Cited

U.S. PATENT DOCUMENTS

| | | | | |
|---|---|---|---|---|
| 4,562,478 A * | 12/1985 | Hirasawa et al. | ............. | 348/838 |
| 4,652,932 A * | 3/1987 | Miyajima et al. | ............. | 348/794 |
| 4,821,177 A * | 4/1989 | Koegel et al. | ............. | 711/149 |
| 5,020,129 A * | 5/1991 | Martin et al. | ............. | 725/27 |
| 5,023,931 A * | 6/1991 | Streck et al. | ............. | 455/66 |
| 5,045,948 A * | 9/1991 | Streck et al. | ............. | 348/734 |
| 5,321,514 A | 6/1994 | Martinez | ............. | 348/723 |
| 5,351,270 A * | 9/1994 | Graham et al. | ............. | 455/23 |
| 5,557,320 A * | 9/1996 | Krebs | ............. | 725/114 |
| 5,568,205 A | 10/1996 | Hurwitz | ............. | 348/723 |
| 5,633,891 A * | 5/1997 | Rebec et al. | ............. | 375/219 |
| 5,708,961 A * | 1/1998 | Hylton et al. | ............. | 725/81 |
| 5,729,549 A * | 3/1998 | Kostreski et al. | ............. | 370/522 |
| 5,734,589 A * | 3/1998 | Kostreski et al. | ............. | 715/716 |
| 5,812,930 A * | 9/1998 | Zavrel | ............. | 725/62 |
| 5,915,020 A * | 6/1999 | Tilford et al. | ............. | 348/838 |
| 5,948,040 A * | 9/1999 | DeLorme et al. | ............. | 701/201 |
| 5,983,073 A * | 11/1999 | Ditzik | ............. | 455/11.1 |
| 5,991,599 A * | 11/1999 | Uchikawa | ............. | 455/11.1 |
| 5,999,908 A * | 12/1999 | Abelow | ............. | 705/1 |
| 6,097,441 A * | 8/2000 | Allport | ............. | 348/552 |
| 6,122,526 A * | 9/2000 | Parulski et al. | ............. | 455/556.1 |
| 6,405,049 B2 * | 6/2002 | Herrod et al. | ............. | 455/517 |
| 2005/0198677 A1* | 9/2005 | Lewis | ............. | 725/87 |

FOREIGN PATENT DOCUMENTS

| | | |
|---|---|---|
| JP | 4-237246 | 8/1992 |
| JP | 4-245818 | 9/1992 |
| JP | 6-153165 | 5/1994 |
| WO | WO 97/26724 | 7/1997 |

* cited by examiner

*Primary Examiner* — Benjamin R Bruckart
*Assistant Examiner* — Anthony Bantamoi

(57) ABSTRACT

The present invention provides a system including a portable device capable of displaying information from, and transmitting commands/controls to, a base station audio/video/data source via a local transceiver module. The audio/video/data source may be embodied in a portable or stationary satellite receiver/decoder, a local video source, or any similar device. The present invention allows for highly portable access to satellite information, without need for a satellite reception antenna associated with each portable device, and without disturbing the equipment in direct contact with the satellite as the portable devices are moved in a highly portable manner. Other embodiments of the present invention provide a distribution method and apparatus for use in theater or stadium settings.

19 Claims, 3 Drawing Sheets

MINIATURE WIRELESS AUDIO/VIDEO/DATA DISTRIBUTION AND ACCESS SYSTEM

BACKGROUND OF THE INVENTION

Satellite signals intended for earth reception, and in particular those used for wide area audio/video/data communication, are typically low power and highly directional in nature. Although a satellite may offer coverage over a large geographical area, such as the United States, earth stations that want to receive the satellite signals must point their antennas directly at the satellite. That is, even though the earth station is within the footprint of the satellite, it is necessary for the antenna of the earth station be aligned with the satellite in order to receive the signal from the satellite. Because of the generally low power of many broad area satellite transmissions, it is necessary in many systems to use an antenna (whether flat or reflector type) having a relatively large aperture or size. The various procedures that must be performed when aligning an earth station antenna can be time consuming and inconvenient. Additionally, any obstructions in the path between the satellite and the earth station will disrupt signal reception at the earth station.

Due to the size and position-sensitive nature of the placement of the earth station, even "portable" earth stations are somewhat restricted in their movement and placement. Although many earth stations are small and light enough to be considered portable, they still require either proper antenna alignment or an expensive, large and complicated tracking antenna mechanism. Suitable antennas may also be relatively large and heavy in comparison to other receiver components. Therefore, it would be desirable to access satellite information, in a highly portable manner, without the restriction of a fixed earth station installation or the position-sensitive characteristics of portable earth stations.

SUMMARY OF THE INVENTION

The present invention provides a system for distribution of audio, video and data information from a satellite receiver to a portable audio/video/data display unit. The system includes a base station satellite receiver and antenna system which receives transmission(s) from one or more satellites (and possibly other local or remote sources) and couples audio, video, and data signals to a transceiver module. The transceiver module converts the audio/video/data signals to local area retransmission signals, such as radio frequency (RF) signals, that are received, processed, displayed and, in preferred embodiments, stored for future use by one or more portable audio/video/data display units. The highly portable local receivers of the present invention provides access to satellite based information without the movement or position restrictions of conventional satellite terminals.

The invention itself, together with further objects and attendant advantages, will best be understood by reference to the following detailed description, taken in conjunction with the accompanying drawings.

DESCRIPTION OF THE PREFERRED EMBODIMENT

The present invention provides a highly portable device capable of displaying information from, and transmitting commands/controls to, an audio/video/data source via a transceiver module. It should be understood that as used herein, reference to audio/video/data sources, signals or components is intended to include various forms of audio and/or video data, in any format (analog and/or digital, encrypted or not, etc.), and is specifically intended to include data in addition to audio and video. The audio/video/data source is provided in one or more base station units, which may comprise a portable or stationary satellite receiver/decoder, a suitable satellite antenna system, a television or video camera, other signal receivers, other input devices, or any similar device. The present invention allows for portable access to satellite information by means of one or more highly portable units, without disturbing the base station equipment in direct contact with the satellite. Additionally, the present invention provides a distribution method and apparatus for use in theater or stadium settings.

Figure 1:
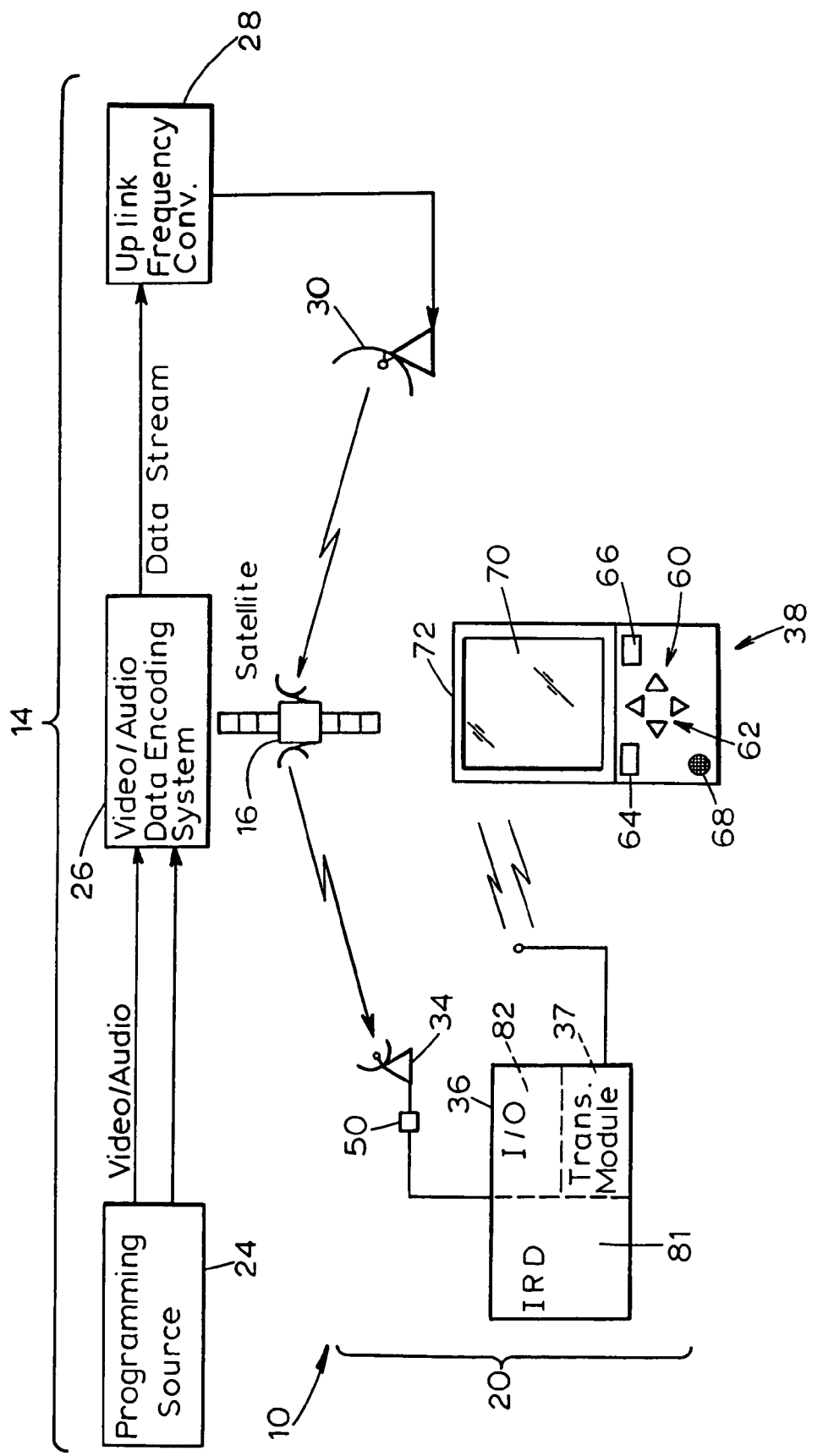
FIG. 1 is a diagram illustrating a miniature wireless audio/video/data distribution and access system embodying the present invention.

Referring to FIG. 1, a block diagram of a transmission and reception system 10 embodying features of the present invention is shown. The illustrated system 10 includes a transmission station (or uplink facility) 14, a relay 16, and one or more base stations, one of which is shown at reference numeral 20. A wireless airlink provides the communications medium between the transmission station 14, the relay 16, and the base station 20. The transmission station 14 includes a programming source 24, a video/audio/data encoding system 26, an uplink frequency converter 28, and an uplink satellite antenna 30. The relay 16 is preferably at least one geosynchronous satellite. The base station 20 includes a satellite reception antenna system 34 (which may include a low-noise-block (LNB) 50 connected to the antenna 34), and a receiver electronics 36 which include an integrated receiver/decoder (IRD) unit 81 connected to the LNB 50, and a miniature wireless audio/video/data unit (MWAVU) 38, connected to the IRD unit 81 via a local retransmission link, such as radio frequency (RF) link. The IRD unit 81 is in communication with a miniature wireless audio/video/data unit (MWAVU) 38 of the present invention via a transceiver module 37 within the receiver 36. The transceiver module 37 receives information from the IRD unit 81 (and, in some embodiments, other input devices) and re-broadcasts the information to the MWAVU 38. The transceiver module 37 may transmit the information at any allocated frequency such as 46-49 MHz, 900 MHz, or 1.8 GHz. Any number of modulation methods may be employed including amplitude modulation (AM) or frequency modulation (FM). Additionally, various digital modulation methods such as direct sequence spread-spectrum or frequency hopping spread spectrum may be used. In certain embodiments, other forms of wireless connection may be used, such as (by way of example only) infrared or other optical communication, cellular distribution, etc. Infrared communication may be suitable for certain limited or indoor uses.

The transceiver module 37 serves to generate a local signal that transmits information from the receiver unit 36 to the MWAVU 38, thus acting as a local pipeline for information received from the transmission station 14 and, in some embodiments, from other remote or local sources. The transceiver module 37 may be linked to the receiver unit 36 via an internal connection within the receiver unit 36. Optionally, the transceiver 37 module may be an external component connected to the receiver unit 36 via a port provided on the receiver unit 36, or by any other means of providing information from the receiver unit 36 to the transceiver module 37.

The transceiver module 37 is also capable of receiving information from the MWAVU 38 and transferring it to the receiver unit 36. This information may include, but is not limited to, user commands for controlling the IRD unit 81. For example, commands from the MWAVU 38 may be navigational, menu, or select commands, which may be used to control the IRD unit 81 remotely. The reverse channel transmission may be of any suitable wireless type, and may differ from the type utilized for the forward direction signals previously discussed.

Figure 3:
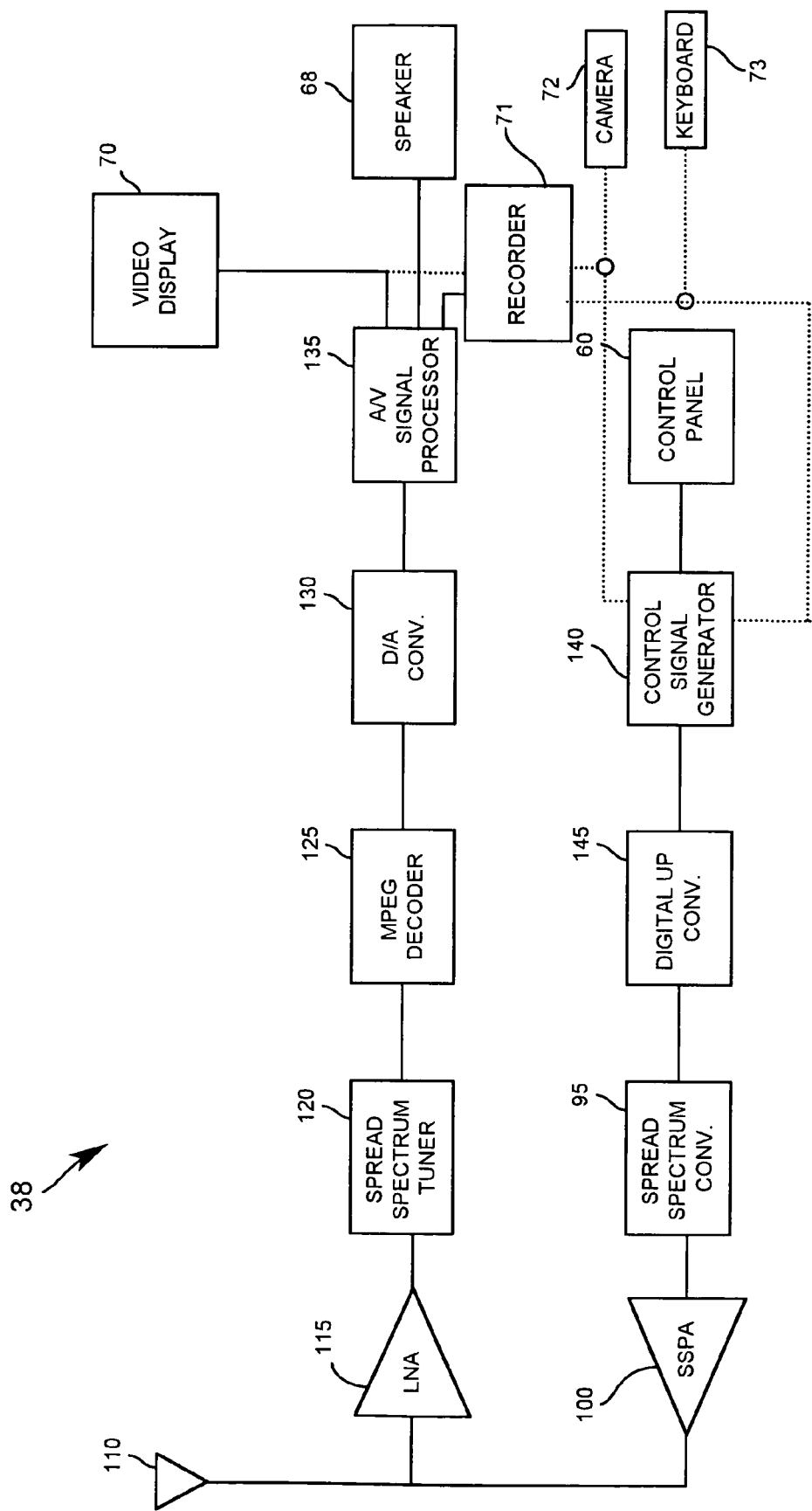
FIG. 3 is a diagram showing the functional components of the miniature wireless audio/video/data unit shown in FIG. 1.

The MWAVU 38 receives information from the transceiver module 37, and processes the received information as appropriate. For example, it may display the relevant video and/or data, and/or play the relevant audio contained in the received information. In certain embodiments, the MWAVU 38 may also include a recorder 71 for locally storing all or portions of the received information. The recorder 71 may take any suitable form, such as magnetic storage (e.g., tape, writeable disk), optical (e.g., laser), CD-R (recordable, rewriteable), DVD (writeable, rewriteable) or any memory device (e.g., RAM, crystal, semiconductor). In one preferred embodiment, the recorder 71 may comprise a miniature videotape recorder, such as an 8 mm transport and associated components. More than one form of memory may be used, such as a tape transport for large file recordings (e.g. video/audio) and electronic memory for e.g. specific data. If desired, local inputs may also be provided for recorder 71, such as a camera element 72 or keyboard 73, to allow recording of local events (as shown in FIG. 3).

The MWAVU 38 is also capable of sending information used to control the IRD unit 36. Other information may also be sent to the base station 36 via the transceiver system. For example, the camera 72 and/or the keyboard 73 may also be linked to the back channel of the transceiver, to permit transmission of local information to the base station 20.

The MWAVU 38 thus serves as a remote terminal that may be used to access information from the IRD unit 36, and (in certain embodiments) provide information to the base station. The maximum distance of use between the MWAVU 38 and the transceiver module 37 is dependent on the transmission power and the frequency selected for the communication link(s).

The MWAVU 38 includes a user control panel 60 which serves as an interface between the electronics of the MWAVU 38 and a user. Controls on the panel 60 may include, but are not limited to, navigational controls such as directional keys 62, a menu key 64, and a select key 66. The MWAVU 38 further comprises an audio speaker 68 and a display screen 70. Note that more than one speaker 68 may be used to facilitate stereo sound. All of the components of the MWAVU 38 are contained within a compact unitary housing 72. The navigational keys 62 allow a user to interact with on-screen programming that may take place on the MWAVU 38. For example, the menu key 64 may access an on-screen programming menu while the directional keys 62 may provide a way to maneuver a cursor on the screen 70 during programming. After positioning the cursor at a desired location, the select key 66 may be used to inform the MWAVU 38 that the user wishes to activate or select the entity on which the cursor is placed. The MWAVU 38 then proceeds to forward the user entered command to the base station 20, via the transceiver module.

Figure 2:
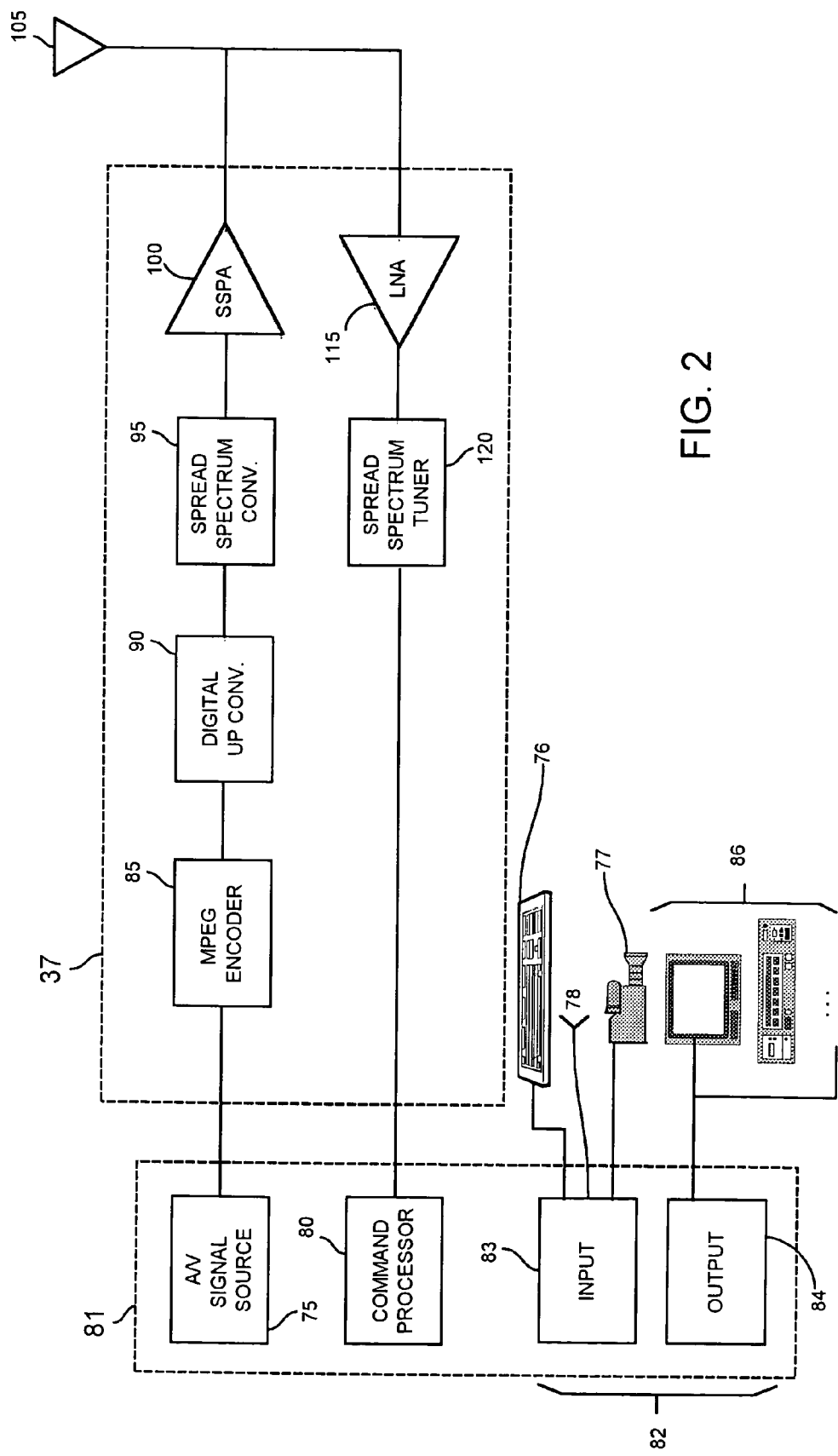
FIG. 2 is a diagram showing the functional components of the audio/video/data source and the transceiver module as shown in FIG. 1.

FIGS. 2 and 3 are diagrams showing the functional components of a preferred embodiment of the present invention. The following description will be given with respect to FIGS. 2 and 3. Note that the description given is for that of the preferred embodiment and a variety of changes or substitutions may be made.

FIG. 2 is a block diagram illustrating the functional components of the receiver unit 36, including IRD unit 81, transceiver module 37, and optional I/O circuits 82 relevant to the present invention. After appropriate down converting, decoding, and decryption of a received satellite signal, the IRD unit 81 can be represented as an audio/video/data (A/V) signal source 75 and a command processor 80. When audio or video information is to be sent to a MWAVU 38 from the IRD unit 81, the A/V signal source 75 generates the signal to be sent and couples the signal to the transceiver module 37. The signal to be transmitted is coupled to e.g. an MPEG encoder 85, which converts the signal to be transmitted to MPEG formatted data, e.g. MPEG-1 or MPEG-2. The MPEG formatted data is upconverted by a digital upconverter 90, which is coupled to a spread spectrum converter 95. The spread spectrum converter 95 converts the upconverted MPEG data signal into a spread spectrum signal for transmission. Note that there is a variety of spread spectrum transmission methods that may be used, including direct sequence spread spectrum and frequency hopping spread spectrum. The output of the spread spectrum converter 95 is coupled to a spread spectrum power amplifier (SSPA) 100, which amplifies the power of the spread spectrum signal to a level suitable for transmission by the antenna 105.

The signals, which are transmitted by the transceiver module 37, are received by the MWAVU antenna 110, which is preferably mounted within the unitary housing 72. The signals from the antenna 110 are amplified by a low noise amplifier (LNA) 115, before being passed to a spread spectrum tuner 120. The spread spectrum tuner 120 performs the function of receiving and decoding the spread spectrum encoded signal. Many methods of encoding and decoding information for spread spectrum transmission are well known in the art. The output of the spread spectrum tuner 120 is coupled to an MPEG decoder 125, which decodes the MPEG encoded data from the spread spectrum tuner 120. A digital to analog converter (DAC) 130 converts the decoded data stream into an analog signal. The analog signal is passed to the A/V signal processor 135, which generates appropriate video and audio signals. The video display 70 and the speakers 68 receive input signals from the A/V signal processor 135.

The receiver unit 36 may also comprise additional input/output elements 82. By way of example, input circuits 83 may be provided to receive local inputs for processing and broadcast via transceiver module 37 to the MWAVU 38. The input circuits 83 may receive inputs from a keyboard 76 or other external user input device. Audio/video/data inputs may also be supported, such as from a local video camera 77 or similar device. Other audio/video/data and/or data inputs may be provided via wired or optical inputs 78, such as by means of coaxial cable or via a distributed (e.g. LAN or WAN) data network.

Input circuits 83 may be functionally linked to the A/V signal source 75 and/or the command processor 80 of the IRD unit 81. Alternatively, the input signals may be preferably functionally linked to the transceiver module 37 as alternate inputs to the MPEG encoder (for locally supplied audio/video/data information, e.g. from video camera 77). Where locally generated data is to be broadcast, the MPEG encoder 85 of the transceiver unit 37 may include suitable packet formation and multiplexing capabilities.

The input/output circuits 82 may further comprise output circuits 84. These circuits may be part of the IRD unit 81, or may be supplemental to the IRD unit circuits. By way of example, outputs generated from both signals received via the transceiver unit 37 and, if desired, locally generated signals (e.g. received by input circuits 83) may be sent to various external devices 86 such as displays, recorders, or external processing equipment.

The communication link between the MWAVU 38 and the transceiver module 37 is preferably bi-directional. The purpose of the reverse channel path from the MWAVU 38 to the transceiver module 37 is to convey commands which may be used to control the IRD unit 81. The user control panel 60 provides a user interface to the MWAVU 38. The controls may be navigational controls 62, a select key 66, or a menu key 64. The controls entered by the user are interpreted by a control signal generator 140, which outputs a digital code representative of the control pressed on the control panel 60. The digital code from the control signal generator 140 is up-converted by a digital up-converter 145, which creates a digital signal at a frequency suitable for transmission. The output of the digital up-converter 145 is coupled to a spread spectrum converter 95, which is further coupled to a spread spectrum power amplifier 100, all of which function as previously disclosed. From the spread spectrum power amplifier 100 the signal for transmission is coupled to the antenna 110. The antenna 105 on the transceiver module 37 receives the signal transmitted from the MWAVU antenna 110 and couples the signal to an LNA 115 which amplifies the signal. The output signal from the LNA 115 is connected to a spread spectrum tuner 120 which recovers the data originally output by the control signal generator 140 of the MWAVU 38. The output of the spread spectrum tuner 120 is connected to the command processor 80, which is contained in the IRD unit 81. The command processor 80 performs the function of interpreting the commands received from the MWAVU 38. The commands to the IRD unit 81 from the MWAVU 38 may be navigational or control commands.

As previously discussed, in certain embodiments the MWAVU 38 may further include a recorder 71 or other memory system for storing audio/video/data and/or data information for later retrieval.

In certain embodiments the reverse communication channel between the MWAVU 38 and the base station 20 may be used to transmit information other than control signals for controlling operation of the IRD unit 81. For example, a keyboard 73, which may have an integral mouse, may be provided, either internal or external to the MWAVU 38, to allow other local user data or control inputs that are transmitted to the base station 20 by means of the transceiver unit 37. Alternatively or in addition, local audio/video/data input device(s) may be provided, such as camera 72, to receive local A/V inputs for processing and transmission to the base station 20 by means of the reverse communication channel. Of course, where video is to be transmitted, the reverse communication channel must have a suitably high bandwidth. It will be understood by those skilled in the relevant art that, when local data or A/V inputs are supported for inclusion in the reverse transmission channel, appropriate signal processing circuitry (e.g. A/D, packetizer, encoder, multiplexer, etc.) must be provided. Such circuits may be incorporated into the control signals generator 140, or may be otherwise configured within MWAVU 38. The local input devices such as camera 72 and keyboard 73 may also be linked to the recorder 71 (if supplied) to provide further functionality to the portable unit.

Optionally, the communication paths between the base unit and the portable unit could be encrypted in any known manner. This encryption would provide a secure link where appropriate (e.g., military uses). The IRD unit may receive encrypted information and decrypt the information as part of processing, the transceiver may then encrypt the information sent to the portable unit. Alternatively, the base station may receive encrypted and packetized information and forward that information to the portable unit in its still encrypted and packetized format.

In a preferred embodiment, multiple functions represented in FIGS. 2 and 3 may be carried out by a single integrated circuit. The functions of the spread spectrum converter 95 and the spread spectrum tuner 120 will preferably carried out by a single integrated spread spectrum transceiver such as the AMI SX043/H, which performs both transmission and reception of spread spectrum signals. Additionally, MPEG encoding and decoding such as is done by blocks 85 and 125 may be performed by a single integrated MPEG-1 and AVI encoding chip, such as the DEC 21230.

In an alternative embodiment, the satellite uplink components may be replaced or supplemented by a hardwired cable-type distribution system or other input system. Such a distribution system may provide audio and video information to the transceiver 37. The transceiver 37 in turn locally broadcasts the information to a MWAVU 38. In such a manner, the present system may be used to broadcast information to remote units in a local area. Applications for this system may include sporting events, trade shows, or movie theaters, wherein relevant audio or video may be broadcast to consumers or customers carrying MWAVU's 38.

Although preferred embodiments of the MWAVU 38 and transceiver module 37 support bi-directional communication, it should be understood that certain embodiments may utilize only forward direction, uni-directional communication between the base station 20 and the MWAVU 38. In such systems, control signals cannot be returned to the base unit by means of the wireless communication link. This may be acceptable in certain applications where control of the signal source (e.g. IRD unit 81) at the base station 20 is not required. In one example, the base station may distribute only a single selected program or information stream for reception and processing by all MWAVUs. A mixture of bi-directional and uni-directional MWAVUs may also be used, where control signals are received from one or a subset of MWAVUs. In other examples, the base station 20 may process a plurality of programs, transmitted in frequency, time or other multiplexed fashion. The MWAVUs 38 may then include appropriate tuning or selection circuits for isolating the desired program at the MWAVU under local control.

Although the preferred embodiments have been described in connection with a base station 20 having a single IRD module 81, it should be understood that multiple IRD modules may also be supported in a single base station. In one example, a plurality of IRD modules may be individually addressable by groups of one or more MWAVUs 38. A given MWAVU may be provided with a coded identification that is included in any back channel communication, so that control signals from the MWAVU will operate only a selected one (or more) of the plurality of IRD modules. In other embodiments, the control signals from a plurality of MWAVUs 38 may be coded, and prioritized, such that control signals received from preferred MWAVU(s) may take precedents over control inputs from lower priority units.

Of course, it should be understood that a range of changes and modifications can be made to the preferred embodiment described above. For example, the functional blocks represented in FIG. 2 and FIG. 3 may be carried out by integrated circuits at varying levels of integration. That is, multiple functions may be integrated into a single chip. As technology advances, more and more hardware functions may be carried out as software functions. Software may be implemented through various hardware elements such as microprocessors and digital signal processors, thus raising the level of integration from multiple hardware functions to multiple software functions executed by a single hardware component. A vast array of design and implementation decisions must be made when an embodiment of the present invention is produced, all possible embodiments resulting from the design process are understood to be dependent on the underlying concept set forth in this patent.

What is claimed is:

1. An audio/video/data distribution system for distributing audio and video signals comprising:
   a base unit comprising a plurality of integrated receiver/decoders, each of which directly receives the audio and video signals, converts the audio and video signals to local retransmission signals, and transmits the local retransmission signals; and
   at least one remote terminal having communication circuitry that allows direct two-way communication with the base unit, the communication circuitry being connected to an element that receives the transmitted local retransmission signals, the remote terminal recovering the video signals from the received local retransmission signals, displaying the video signals on a display portion connected to the remote terminal, and playing the audio signals on a speaker connected to the remote terminal;
   wherein the plurality of integrated receiver/decoders are individually addressable by the remote terminal, the remote terminal conveys commands to control the integrated receiver/decoders that are individually addressable by the remote terminal, and the remote terminal is provided with a coded identification, so that control signals from the remote terminal operate a selected one, as well as more than one, of the plurality of integrated receiver/decoders that are individually addressable by the remote terminal, and
   wherein the plurality of receiver/decoders are individually addressable by a group of one or more remote terminals, and the control signals are prioritized, such that the control signals from preferred remote terminals take precedence over control signals from lower priority remote terminals.

2. The system of claim 1 wherein the base unit receives at least one additional video signal from a local audio/video/data source.

3. The system of claim 2 wherein the base unit receives at least some of the additional video signals from a camera.

4. The system of claim 1 wherein the remote terminal is a portable display unit and the portable display unit further comprises:
   a display portion capable of displaying video signals;
   an audio speaker for playing audio signals that accompany the video signals; and
   a user control panel.

5. The system of claim 1 wherein at least one way of the two-way communication with the base unit is encrypted.

6. The system of claim 1 wherein the plurality of integrated receiver/decoders are individually addressable by a group of one or more remote terminals.

7. The system of claim 6 wherein the control signals are prioritized, such that the control signals from preferred remote terminals take precedence over control signals from lower priority remote terminals.

8. A portable display unit comprising:
   a display portion capable of displaying video signals;
   an audio speaker for playing audio signals that accompany the video signals;
   a user control panel; and
   communication circuitry that allows direct bi-directional RF communication with a remote base unit comprising a plurality of receiver/decoders that directly receive the video and audio signals from a satellite, encode the video and audio signals, and transmit the encoded audio and video signals to the portable display unit;
   wherein the plurality of receiver/decoders are individually addressable by the portable display unit, and the portable display unit conveys commands to the remote base unit to operate a selected one, as well as more than one, of the plurality of receiver/decoders that are individually addressable by the portable display unit, and
   wherein the plurality of receiver/decoders are individually addressable by a group of one or more portable display units, and the control signals are prioritized, such that the control signals from preferred portable display units take precedence over control signals from lower priority portable display units.

9. The portable display unit of claim 8 further comprising an audio/visual input device, wherein video data generated from the audio/visual input device is transmitted to the remote base unit.

10. The portable display unit of claim 8 wherein at least one direction of the bi-directional communication is encrypted.

11. A system comprising:
   a ground-based receiver station comprising:
   a plurality of integrated receiver/decoder units coupled to an antenna that directly receive audio and video signals from the antenna; and
   a first omni-directional antenna that is coupled to the receiver/decoder units;
   the receiver/decoder units converting the audio and video signals to RF signals and transmitting the RF signals via the first omni-directional antenna directly to a portable unit, which includes a recorder for recording the audio and video signals, and the receiver/decoder units including communication circuitry to receive communication transmitted from the portable unit to the receiver/decoder units via the first omni-directional antenna, wherein the plurality of receiver/decoder units are individually addressable by the portable unit, and the portable unit conveys commands to operate a selected one, as well as more than one, of the plurality of receiver/decoder units that are individually addressable by the portable unit, and
   wherein the plurality of receiver/decoders are individually addressable by a group of one or more portable units, and the control signals are prioritized, such that the control signals from preferred portable units take precedence over control signals from lower priority portable units.

12. The system of claim 11, the portable unit further comprising:
   a display portion capable of displaying video signals;
   an audio speaker for playing audio signals that accompany the video signals;
   a user control panel; and
   circuitry that allows communication with the receiver/decoder unit.

13. The system of claim 11 wherein the circuitry and the control panel interact to allow a user to send commands to the receiver/decoder unit.

14. The system of claim 11 wherein a plurality of portable units are addressable by control signals from the receiver/decoder unit.

15. The system of claim 14 wherein the control signals are coded.

16. The system of claim 14 wherein the control signals are prioritized.

17. The system of claim 11, wherein the receiver/decoder unit further performs at least one of encrypting the RF signals or decrypting the communication from the portable unit.

18. The system of claim 11 wherein the plurality of receiver/decoder units are individually addressable by a group of one or more portable units.

19. The system of claim 18 wherein the control signals are prioritized, such that the control signals from preferred portable units take precedence over control signals from lower priority portable units.

* * * * *